(12) United States Patent
Grieser-Schmitz et al.

(10) Patent No.: US 8,231,952 B2
(45) Date of Patent: Jul. 31, 2012

(54) INSULATED PIPES

(75) Inventors: Christof Grieser-Schmitz, Osnabrueck (DE); Wilhelm Lindemann, Preussisch Oldendorf (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 502 days.

(21) Appl. No.: 12/531,700

(22) PCT Filed: Apr. 2, 2007

(86) PCT No.: PCT/EP2007/053167
§ 371 (c)(1),
(2), (4) Date: Sep. 17, 2009

(87) PCT Pub. No.: WO2008/119388
PCT Pub. Date: Oct. 9, 2008

(65) Prior Publication Data
US 2010/0098891 A1    Apr. 22, 2010

(51) Int. Cl.
*B29D 22/00* (2006.01)
*B29D 23/00* (2006.01)
*B32B 1/08* (2006.01)
*B65D 39/00* (2006.01)

(52) U.S. Cl. ............... 428/36.5; 428/36.91; 521/137; 138/149

(58) Field of Classification Search .............. 428/36.91, 428/36.5; 521/137; 138/149
See application file for complete search history.

(56) References Cited

U.S. PATENT DOCUMENTS

| | | |
|---|---|---|
| 4,307,756 A | 12/1981 | Voigt et al. |
| 2004/0048015 A1 | 3/2004 | Berger |

FOREIGN PATENT DOCUMENTS

| | | |
|---|---|---|
| DE | 142807 | 7/1903 |
| DE | 197 42 012 | 3/1999 |
| DE | 10 2004 001 317 | 8/2005 |
| EP | 0 865 893 | 9/1998 |
| EP | 0 960 723 | 12/1999 |
| EP | 1 595 904 | 11/2005 |
| EP | 1 777 244 | 4/2007 |
| EP | 1 783 152 | 5/2007 |
| WO | 00 39497 | 7/2000 |

*Primary Examiner* — Michael C Miggins
(74) *Attorney, Agent, or Firm* — Oblon, Spivak, McClelland, Maier & Neustadt, L.L.P.

(57) ABSTRACT

A process for the batchwise production of insulated pipes, comprising the steps:
1) provision of medium pipe and casing, the medium pipe being arranged inside the casing,
2) production of a polyisocyanurate foam by reacting an isocyanate component (a) with a polyol mixture (b) between medium pipe and casing,
wherein the polyol mixture (b) comprises no polyester alcohols and has a viscosity of less than 1300 mPa·s, measured according to DIN 53019 at 20° C.

12 Claims, 1 Drawing Sheet

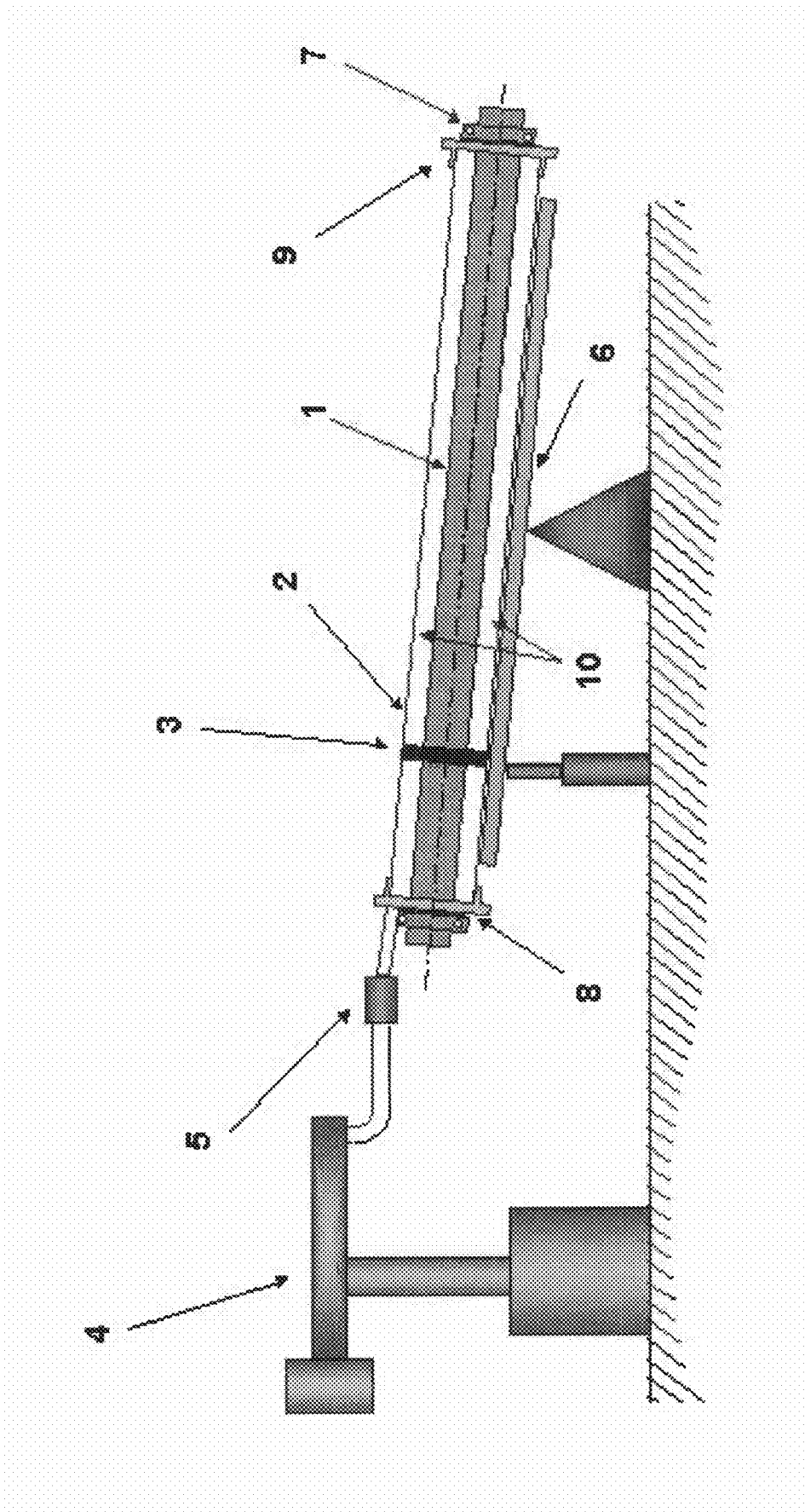

INSULATED PIPES

The invention relates to a process for the batchwise production of insulated pipes, comprising the steps:

1) provision of medium pipe and casing, preferably in each case having a length greater than 5 m, particularly preferably from 5 to 16 m, in particular from 5.4 to 12 m, particularly preferably from 5.7 m to 10 m, the medium pipe being arranged inside the casing,
2) production of a polyisocyanurate foam which, if appropriate, comprises polyurethane structures by reacting an isocyanate component (a) with a polyol mixture (b) between medium pipe and casing, the polyol mixture (b) comprising no polyester alcohols and having a viscosity of less than 1300 mPa·s, preferably less than 1000 mPa·s, particularly preferably less than 700 mPa·s, in particular less than 670 mPa·s, measured in each case according to DIN 53019 at 20° C. Furthermore, the invention relates to insulated pipes obtainable in this manner.

Pipes insulated with polyisocyanurate (also referred to below as PIR)—and/or polyurethane (PU)—foams are known in the prior art and are described, for example, in DE-A 10 2004 001 317, DD 142 807, EP-A-865 893 and DE-A-197 42 012.

The predominant proportion of pre-insulated pipes which use PU foam for the insulation is produced with the aid of the batchwise pipe-in-pipe production.

In this process, the medium pipe (as a rule steel) is provided with star-like spacers which serve for centering the inner pipe. The medium pipe is pushed into the outer covering pipe (as a rule polyethylene or metal sheet) so that there is an annular gap between the two pipes. Because of its outstanding insulation properties, this annular gap is filled with polyurethane foam. For this purpose, the slightly inclined double pipe is provided with end caps which are equipped with vent holes. The liquid reaction mixture is then introduced into the annular gap by means of a polyurethane metering machine and flows down in still liquid form in the pipe gap until the reaction begins. From this time onward, the further distribution takes place by flow of the foam slowly increasing in viscosity, until the material has reacted completely.

For industrial applications, in particular solar installations and superheated steam transport pipes (temperatures>180° C.), the thermal stability of standard PU foams is insufficient. For insulation at very high temperatures, PIR foams are particularly suitable owing to their outstanding insulation properties and the high thermal stability of the isocyanurate groups present in the foam. PIR formation takes place via a highly temperature-controlled mechanism, which leads to a reaction profile which is difficult to influence during the foam formation. The course of the reaction results in the reacting foam having very poor flow properties. In the batchwise foam insulation of pipes, owing to the length of the pipes, this in particular is very important for achieving sufficient filling and the desired physical properties. In the past, it was found that the reaction could be influenced only to an insufficient extent and there are considerable difficulties in filling pipes of 6 m length.

It was therefore an object of the invention to develop a process for the production of insulated pipes based on PIR foam, by means of which even pipes of 6 m length can be foam-insulated. The foam obtainable should have as low a density as possible in combination with very good density distribution. Moreover, the processibility on machines should be improved, in particular foam insulation at pipe temperatures of <40° C. should be permitted. In addition, a mixing ratio of less than 250 parts by weight of isocyanate component per 100 parts by weight of polyol mixture should be accessible.

These objects could be achieved by the insulated pipes described at the outset and the process described at the outset.

By means of the viscosity of the polyol mixture which is established according to the invention, in particular a very good preliminary distribution of the reaction system in the pipe cap is achieved before the reaction mixture begins to foam. Polyol components having high overall viscosities may be distinguished by good flow during foaming, but a poor preliminary distribution in the pipe gap is found. The discovery that there are two processes to be considered independently of one another during the foam insulation of the pipe has now led for the first time to the development of systems having a low viscosity which are distinguished by an excellent preliminary distribution in addition to adequate flow behavior. The use of these systems leads to various advantages:

1. Production of longer pipe s0egments, in particular of 6 m pipes, is possible.
2. Lowered overall density (pipe 60.3/125 mm shot density<125 possible.
3. Improved thermal stability of the foam.
4. Better core density distribution (difference in density distribution at beginning/end<15 kg/m$^3$).
5. Better processibility on machines.
6. Foam insulation and pipe temperatures (medium and outer casing)<40° C. possible.
7. Mixing ratio of less than 250 parts of isocyanate component per 100 parts of polyol mixture possible.

Owing to the use of the polyol components according to the invention, it was possible for the first time for 6 m long pipes to be filled with the desired overall density which is not too high and with a very homogeneous foam structure and to be insulated with a polyisocyanurate foam. With the PIR systems known to date, such long pipe sections were achievable only with poor foam qualities (very many voids, double skins and inhomogeneities) and relatively high densities of>125 kg/m$^3$. The advantages of the present PIR system therefore consist firstly in the possibility of being able to produce 6 m long pipes at all in a "reasonable" manner and moreover in being able to achieve densities of<125 kg/m$^3$ owing to the good preliminary distribution. The result according to the invention is a PIR foam having outstanding high-temperature properties.

In a preferred embodiment, the layer of insulation material has a core density of from 45 to 100 kg/m$^3$, preferably from 55 to 90 kg/m$^3$, particularly preferably from 60 to 85 kg/m$^3$. Here, core density is understood as meaning the lowest density at any desired pipe cross section.

Insulated pipes in which the polyol mixture used, consisting of (b 1) polyols, (b 2) catalysts and, if appropriate, (b 3) chemical blowing agents, (b 4) crosslinking agents, (b 5) chain extenders and/or (b 6) additives, has a viscosity of less than 1300 mPa·s, preferably less than 1000 mPa·s, particularly preferably less than 700 mPa·s, in particular less than 670 mPa·s, measured in each case according to DIN 53019 at 20° C., are preferred. Accordingly, a polyol mixture which comprises (b 1) polyols, (b 2) catalysts and, if appropriate, (b 3) chemical blowing agents, (b 4) crosslinking agents, (b 5) chain extenders and/or (b 6) additives is preferably used in the process according to the invention. The polyol mixture consisting of (b 1) polyols, (b 2) catalyst and, if appropriate, (b 3) chemical blowing agents, (b 4) crosslinking agents, (b 5) chain extenders and/or (b 6) additives preferably has a viscosity of less than 1300 mPa·s, preferably less than 1000 mPa·s, particularly preferably less than 700 mPa·s, in particular less than 670 mPa·s, measured in each case according to DIN 53019 at 20° C.

This stated viscosity relates to polyol mixtures (b) which, as described, comprise no physical blowing agents. Values of 100 mPa·s, measured according to DIN 53019 at 20° C., have proven to be expedient as the lower limit of the viscosity.

It is in principle also possible to add physical blowing agents to the polyol mixture. However, the addition of physical blowing agents leads to a significant reduction in the viscosity. The statements made above with regard to the viscosity of the polyol mixture (b) therefore relate to the viscosity of the polyol mixture (b) without addition of physical blowing agents, even for the case when they comprise physical blowing agents.

The reaction of the isocyanate component (a) with the polyol mixture (b) is preferably carried out at an index of from 250 to 800, preferably from 280 to 600, particularly preferably from 300 to 500, very particularly preferably from 300 to 400. The index is defined by the ratio of the isocyanate groups of the component (a) which are used altogether in the reaction to the groups reactive toward isocyanates, i.e. the active hydrogens, of the component (b), i.e. the polyol mixture. At an index of 100, there is one active hydrogen atom, i.e. one function reactive toward isocyanates, of the component (b) per isocyanate group of the component (a). At indexes above 100, more isocyanate groups are present than OH groups.

The starting materials are described in detail below:

The conventional aliphatic, cycloaliphatic and in particular aromatic di- and/or polyisocyanates are used as isocyanate component (a). Toluylene diisocyanate (TDI), diphenylmethane diisocyanate (MDI) and in particular mixtures of diphenylmethane diisocyanate and polyphenylenepolymethylene polyisocyanates (crude MDI) are preferably used. The isocyanates may also be modified, for example by incorporation of uretdione, carbamate, isocyanurate, carbodiimide, allophanate and in particular urethane groups. The isocyanate component (a) can also be used in the form of polyisocyanate prepolymers. These prepolymers are known in the prior art. The preparation is effected in a manner known per se, by reacting polyisocyanates (a) described above, for example at temperatures of about 80° C., with compounds having hydrogen atoms reactive toward isocyanates, preferably with polyols, to give polyisocyanate prepolymers. The polyol/polyisocyanate ratio is generally chosen so that the NCO content of the prepolymer is from 8 to 25% by weight, preferably from 10 to 22% by weight, particularly preferably from 13 to 20% by weight.

In particular, PMDI is used for the production of rigid polyisocyanurate foams.

In a preferred embodiment, the isocyanate component (a) is chosen so that it has a viscosity of less than 600 mPa·s, preferably from 100 to 450, particularly preferably from 120 to 370, in particular from 170 to 250, mPa·s, measured according to DIN 53019 at 25° C.

According to the invention, no polyester polyols are used as polyols (constituent 1). According to the invention, polyether alcohols are preferably used. For example, compounds having at least two groups reactive toward isocyanate, i.e. having at least two hydrogen atoms reactive with isocyanate groups, are suitable. Examples of these are compounds having OH groups, SH groups, NH groups and/or $NH_2$ groups.

Preferably used polyols (constituent 1) are compounds based on polyetherols. The functionality of the polyetherols is in general from 1.9 to 8, preferably from 2.2 to 6, particularly preferably from 2.4 to 5, very particularly preferably from 2.6 to 4.0.

The polyols (b 1) preferably have a hydroxyl number greater than 25, preferably greater than 30, mg KOH/g, preferably greater than 35 mg KOH/g, KOH/g. In general, 1000 mg KOH/g, preferably 800 mg KOH/g, in particular 600, very particularly 500, mg KOH/g, has proven useful as the upper limit of the hydroxyl number.

Component (b 1) preferably comprises polyether polyols which are prepared by known processes, for example by anionic polymerization with alkali metal hydroxides, such as sodium or potassium hydroxide, or alkali metal alcoholates, such as sodium methylate, sodium or potassium methylates or potassium isopropylate, as catalysts and with addition of at least one initiator which comprises from 2 to 8, preferably from 3 to 8, reactive hydrogen atoms per molecule, or by cationic polymerization using Lewis acids, such as antimony pentachloride, boron fluoride etherate, etc., or bleaching earth as catalysts, from one or more alkylene oxides having 2 to 4 carbon atoms in the alkylene radical.

Suitable alkylene oxides are, for example, tetrahydrofuran, 1,3-propylene oxide, 1,2- or 2,3-butylene oxide, styrene oxide and preferably ethylene oxide and 1,2-propylene oxide. The alkylene oxide can be used individually, alternately in succession or as mixtures.

Suitable initiator molecules are alcohols, such as, for example, glycerol, trimethylol-propane (TMP), pentaerythritol, sucrose, sorbitol, propylene glycol (PG) and amines, such as, for example, methylamine, ethylamine, isopropylamine, butylamine, benzylamine, aniline, toluidine, toluenediamine (TDA), naphtylamine, ethylenediamine, diethylenetriamine, 4,4'-methylenedianiline, 1,3,-propanediamine, 1,6-hexanediamine, ethanolamine, diethanolamine, triethanolamine and the like.

Condensates of formaldehyde, phenol and diethanolamine or ethanolamine, formaldehyde, alkylphenols and diethanolamine or ethanolamine, formaldehyde, bisphenol A and diethanolamine or ethanolamine, formaldehyde, aniline and diethanolamine or ethanolamine, formaldehyde, cresol and diethanolamine or ethanolamine, formaldehyde, toluidene and diethanolamine or ethanolamine, and formaldehyde, toluenediamine (TDA) and diethanolamine or ethanolamine and the like may furthermore be used as initiator molecules.

Trimethylolpropane (TMP), glycerol and/or propylene glycol (PG) are preferably used as the initiator molecule.

The polyol mixture may optionally comprise catalysts as constituent (b 2). Catalysts (b 2) used are usually compounds which accelerate the PU and/or PIR reaction.

Preferably, organic tin compounds, such as tin(II) salts of organic carboxylic acids, and/or basic amine compounds, preferably tertiary amines, such as, for example, triethylamine, and/or 1,4-diazabicyclo(2,2,2)octane are suitable. The catalysts are generally used in an amount of from 0.001 to 5% by weight, in particular from 0.05 to 3.5% by weight, of catalyst, based on the weight of the component (b).

The reaction is preferably carried out in the presence of catalysts which catalyze the formation of polyisocyanurate structures. Potassium acetate, potassium formate and/or potassium octanoate, particularly preferably potassium acetate, can be used as preferred compounds which catalyze the formation of isocyanurate structures (PIR catalysts). These catalysts are preferably used in amounts of from 0.001% by weight to 4.5% by weight, based on the total weight of the polyol mixture. These PIR catalysts are preferably used in the polyol component.

In addition to these preferred PIR catalysts, further catalysts may be used, for example catalysts which accelerate the formation of polyurethane structures.

In case of doubt, the CAS number is the unambiguous chemical designation in this document.

Glycine, N-((2-hydroxy-5-nonylphenyl)methyl)-N-methyl monosodium salt (CAS number 56968-08-2), (2-hydroxypropyl)trimethylammonium 2-ethylhexanoate (CAS number 62314-22-1), N,N,N-trimethyl-2-hydroxy-1-propylammonium formate, trimethylhydroxypropylammonium formate, 2-((2-dimethylamino)ethyl)methylamino)ethanol (CAS number 2212-32-0) and/or N,N',N"-tris(dimethylaminopropyl)hexahydrotriazine (CAS number 15875-13-5) are also preferably used as catalyst (b 2).

Particularly preferably, from 0.01 to 3.5% by weight of N,N',N"-tris(dimethylaminopropyl)hexahydrotriazine (CAS number 15875-13-5) is mixed into the polyol mixture (b) before the reaction of the isocyanate component (a) with the polyol mixture (b), the weight data being based on the total weight of the polyol mixture (b) comprising N,N',N"-tris(dimethylaminopropyl)hexahydrotriazine.

It is furthermore particularly preferred if, in addition to N,N',N"-tris(dimethylaminopropyl)hexahydrotriazine (CAS number 15875-13-5), dimethylcyclohexylamine (CAS number 98-94-2) is also used as catalyst (b 2).

From 0.01 to 3.5% by weight of dimethylcyclohexylamine is particularly preferably mixed into the polyol mixture (b) before the reaction of the isocyanate component (a) with the polyol mixture (b), the weight data being based on the total weight of the polyol mixture (b) comprising dimethylcyclohexylamine.

In particular, potassium acetate, potassium formate and/or potassium octanoate, particularly preferably potassium acetate, and N,N',N"-tris(dimethylaminopropyl)-hexahydrotriazine (CAS number 15875-13-5) are used as catalysts in the polyol mixture (b).

The polyol mixture may furthermore optionally comprise chemical blowing agents as constituent (b 3). Water or carboxylic acids are preferred as chemical blowing agents, and formic acid is particularly preferred as a chemical blowing agent. The chemical blowing agent is generally used in an amount of from 0.1 to 5% by weight, particularly preferably from 0.2 to 4.0% by weight, in particular from 0.3 to 3.0% by weight, based on the weight of the component (b).

As mentioned above, the polyol mixture may comprise physical blowing agent. This is understood as meaning compounds which are dissolved or emulsified in the feedstocks of the polyisocyanurate and/or polyurethane preparation and evaporate under the conditions of the polyisocyanurate and/or polyurethane formation. These are, for example, hydrocarbons, halogenated hydrocarbons and other compounds, such as, for example, perfluorinated alkanes, such as perfluorohexane, chlorofluorocarbons and ethers, esters, ketones and/or acetals. These are usually used in an amount of from 1 to 30% by weight, preferably from 2 to 25% by weight, particularly preferably from 3 to 20% by weight, based on the total weight of the components b). Pentane, in particular cyclopentane, is particularly preferably used as the blowing agent. In particular, the polyol mixture therefore comprises cyclopentane as a physical blowing agent. The cyclopentane is preferably used in an amount of more than 3.0% by weight, particularly preferably more than 6.0% by weight, very particularly preferably more than 10.0% by weight, in particular more than 12.0% by weight, based on the total weight of the polyol mixture.

In a preferred embodiment, the polyol mixture (b) comprises crosslinking agents as constituent (b 4). Crosslinking agents are understood as meaning compounds which have a molecular weight of from 60 to less than 400 g/mol and have at least 3 hydrogen atoms reactive toward isocyanates. An example of this is glycerol.

The crosslinking agents are generally used in an amount of from 1 to 10% by weight, preferably from 2 to 6% by weight, based on the total weight of the polyol mixture (b) (but without physical blowing agents).

In a further preferred embodiment, the polyol mixture (b) comprises, as constituent (b 5), chain extenders which serve for increasing the crosslinking density. Chain extenders are understood as meaning compounds which have a molecular weight of from 60 to less than 400 g/mol and have 2 hydrogen atoms reactive toward isocyanates. Examples of these are butanediol, diethylene glycol, dipropylene glycol and ethylene glycol.

Chain extenders are generally used in an amount of from 2 to 20% by weight, preferably from 4 to 15% by weight, based on the total weight of the polyol mixture (b) (but without physical blowing agents).

The components (b 4) and (b 5) can be used in the polyol mixture individually or in combination.

In a preferred embodiment, the components (a) and (b) of the polyisocyanurate system are chosen so that the resulting foam has a compressive strength (at a density of 60 kg/m$^3$) greater than 0.25 N/mm$^2$, preferably greater than 0.30 N/mm$^2$, particularly preferably greater than 0.35 N/mm$^2$, measured according to DIN 53421. Ideally, pipes which have compressive strengths of >0.3 N/mm$^2$ and correspond to EN 253 are produced. With the polyisocyanurate foam according to the invention, which, if appropriate, may comprise polyurethane structures, it is possible to obtain insulated pipes with centering of the medium pipe, which insulated pipes meet the requirements according to Table 7—coaxiality tolerance as a function of the nominal external diameter, EN 253:2003.

If appropriate, additives (b 6) can also be incorporated in the polyisocyanurate system according to the invention. Additives (b 6) are the customary assistants and additives known in the prior art, but without physical blowing agents. Surface-active substances, foam stabilizers, cell regulators, fillers, dyes, pigments, flameproofing agents, antistatic agents, hydrolysis stabilizers and/or fungistatic and bacteriostatic substances may be mentioned by way of example. It should be noted that the abovementioned preferred viscosity ranges of the component (b) relate to the polyol mixture (b), including additives (b 6) which are added if appropriate (but excluding physical blowing agent which is added if appropriate). From 1 to 25% by weight of flameproofing agents, based on the total weight of the polyol mixture, are preferably used as the additive. For the production of the foams according to the invention, preferably used flameproofing agents may be halogen-free flameproofing agents. The following are particularly suitable in this context: ammonium polyphosphate, aluminum hydroxide, isocyanurate derivatives and carbonates of alkaline earth metals. Phosphates, such as, for example, triethyl phosphate (TEP-CAS number 78-40-0), diphenyl tolyl phosphate (DPK-CAS number 26444-49-5), phosphonates, such as, for example, diethyl N,N-di(2-hydroxyethyl)aminomethyl phosphonate, melamine, melamine derivatives, such as, for example, melamine cyanurate, and/or mixtures of melamine and expanded graphite are preferably used. It is of course also possible to produce foams according to the invention if, in addition to the preferably used halogen-free flameproofing agents, further halogen-containing flameproofing agents known in polyurethane chemistry are used or concomitantly used, such as, for example, tricresyl phosphate, tris-(2-chloroethyl) phosphate, tris(2-chloro-1-methylethyl) phosphate (TCPP-CAS number 13674-84-5), tetrakis(2-chloroethyl)ethylene diphosphate, dimethyl methane-phosphonate, diethyl diethanolaminomethylphosphonate, tribromo derivative of 2,2-dimethylpropan-1-ol (CAS number 36483-57-5), and commercially available halogen-containing polyol flameproofing agent. In addition to the abovementioned halogen-substituted phosphates, further inorganic or organic flameproofing agents, such as red phosphorus, hydrated aluminum oxide, antimony trioxide, arsenic oxide, calcium sulfate or cornstarch, may also be used. Preferably used flameproofing agents are TCPP, particularly preferably DPK and/or TEP for halogen-free PIR foams.

The polyisocyanurate systems according to the invention are preferably used for the production of insulated pipes, for example of industrial pipes. The invention therefore relates to the use of the polyisocyanurate system according to the invention for the production of insulated pipes.

In a preferred embodiment, the polyisocyanurate system according to the invention is used for the production of insulated composite-casing according to DIN EN 253.

The medium pipe (i) is in general a steel pipe having an external diameter of from 1 to 120 cm, preferably from 4 to 110 cm.

Arranged on the outside of the medium pipe is a layer of insulation material (ii) comprising the polyisocyanurate foam according to the invention. This layer generally has a thickness of from 1 to 25 cm, preferably from 2 to 15 cm.

The reaction of the isocyanate component with the polyol component is preferably carried out with a densification of less than 4, preferably less than 3.5, particularly preferably less than 3, very particularly preferably less than 2.8. Densification is understood as meaning the quotient of the total filling density of the pipe gap divided by the core density produced by free-foaming, determined on an undensified foam body.

In a further preferred embodiment, the layer of insulation material (ii) comprising the polyisocyanurate foam according to the invention has a thermal conductivity of less than 28 mW/mK, preferably from 20 to 27.0, particularly preferably from 20 to 26 measured according to EN ISO 8497.

The casing (iii) surrounds the layer of insulation material and generally consists of plastic or metal, for example of polyethylene or folded spiral-seam metal sheet, and usually has a thickness of from 1 to 30 mm. The internal diameter of the casing is in general from 6 to 140 cm, preferably from 10 to 120 cm. A preferably used casing is an angle-fold metal sheet, i.e. a spirally wound metal sheet. Alternatively, it is preferably possible to use a pipe based on a thermoplastic, e.g. polyethylene, as the casing.

The casing, preferably consisting of plastic (iii), can, if appropriate, consist of a plurality of layers which are combined in the extrusion process. An example of this is the introduction of multilayer films between PU foam and PE casing, the film comprising at least one metal layer for improving the barrier effect.

In the case of the folded spiral-seam pipe, a film can likewise be introduced between PIR foam and metal sheet by suitable constructional measures.

Suitable casings of this type are described in EP-A-b 960 723.

In a particularly preferred embodiment, the insulated pipe is an insulated composite-casing which meets the requirements of DIN EN 253.

The process according to the invention is illustrated by way of example with reference to FIG. 1. In FIG. 1, the meanings are as follows:
1 Medium pipe
2 Casing
3 Spacer
4 PU foaming unit
5 Mixing head
6 Tiltable foaming table
7 Clip
8 Seal
9 End cap with vent holes
10 Annular gap A process according to FIG. 1 is a batchwise process. In this process, the medium pipe 1 (as a rule steel) is provided with star-like spacers 3 which serve for centering the inner pipe 2. The medium pipe 1 is pushed into the outer casing 2 (as a rule polyethylene or metal) so that there is an annular gap 10 between the two pipes. This annular gap is filled with polyisocyanurate foam, owing to its good insulation properties.

For this purpose, the double pipe usually inclined slightly by means of tiltable foaming table 6, preferably inclined at an angle of from 0.01° to 10°, preferably from 1.0° to 7°, is provided with end caps 9 which are equipped with vent holes. The liquid reaction mixture, i.e. the polyisocyanurate system according to the invention, is then introduced into the annular gap by means of a polyurethane metering machine 4 and flows down in still liquid form in the pipe gap until the foam formation reaction begins. From this time onward, the further distribution takes place by flow of the foam slowly increasing in viscosity, until the material has reacted completely.

In a customary embodiment, the PIR system is highly densified in the pipe so that, without clips 7, the end caps 9 would be forced away. Without seal 8, material would be forced out between medium pipe 1 and end cap 9. The vent holes of the end caps are closed with stoppers or automatic valves on incipient foam exit.

We claim:
1. A process comprising:
   1) providing a medium pipe and a casing, wherein the medium pipe is arranged inside the casing,
   2) producing a polyisocyanurate foam by reacting an isocyanate component (a) with a polyol mixture (b) between the medium pipe and the casing,
   wherein the polyol mixture (b) comprises no polyester alcohols and has a viscosity of less than 1300 mPa·s, measured according to DIN 53019 at 20° C.
2. The process according to claim 1, wherein the polyol mixture comprises (b1) a polyol, (b2) a catalyst and, optionally at least one of (b3) a chemical blowing agent, (b4) a crosslinking agent, (b5) a chain extender and (b6) an additive.
3. The process according to claim 1, wherein the polyol mixture comprising (b1) a polyol, (b2) a catalysts and, optionally at least one of, (b3) a chemical blowing agent, (b4) a crosslinking agent, (b5) a chain extender and (b6) an additive, has a viscosity of less than 1300 mPas, measured according to DIN 53019 at 20° C.
4. The process according to claim 1, wherein from 1 to 25% by weight of flameproofing agent, based on the total weight of the polyol mixture, are used as the additive.
5. The process according to claim 1, wherein the medium pipe and the casing each have a length greater than 5 m.
6. The process according to claim 1, wherein the reaction of the isocyanate component (a) with the polyol mixture (b) is carried out at an index of from 250 to 800.

7. The process according to claim 1, wherein the reaction is carried out with a densification of less than 4.0.

8. The process according to claim 1, wherein the polyol mixture (b) is foamed using cyclopentane as a physical blowing agent.

9. The process according to claim 1, wherein the isocyanate component (a) has a viscosity of less than 600 mPas, measured according to DIN 53019 at 25° C.

10. The process according to claim 1, wherein the casing comprises an angle-foiled metal sheet.

11. The process according to claim 1, wherein the casing comprises a pipe comprising a thermoplastic.

12. An insulated pipe obtained by the process according to claim 1.

* * * * *